(12) United States Patent
Tchigevsky

(10) Patent No.: US 9,749,574 B2
(45) Date of Patent: *Aug. 29, 2017

(54) IMAGE MATCHING-BASED POINTING TECHNIQUES

(71) Applicant: INTEL CORPORATION, Santa Clara, CA (US)

(72) Inventor: Izoslav Tchigevsky, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/079,655

(22) Filed: Mar. 24, 2016

(65) Prior Publication Data

US 2016/0212369 A1   Jul. 21, 2016

Related U.S. Application Data

(63) Continuation of application No. 14/223,739, filed on Mar. 24, 2014, now Pat. No. 9,300,893.

(51) Int. Cl.
| | |
|---|---|
| H04N 5/44 | (2011.01) |
| G06F 3/03 | (2006.01) |
| H04N 21/422 | (2011.01) |
| H04N 21/431 | (2011.01) |
| G06F 3/038 | (2013.01) |

(Continued)

(52) U.S. Cl.
CPC ......... *H04N 5/4403* (2013.01); *G06F 3/0304* (2013.01); *G06F 3/0346* (2013.01); *G06F 3/0386* (2013.01); *G06F 3/03542* (2013.01); *H04N 21/42204* (2013.01); *H04N 21/42222* (2013.01); *H04N 21/4312* (2013.01); *H04N 2005/4408* (2013.01); *H04N 2005/4432* (2013.01)

(58) Field of Classification Search
USPC .................................. 348/734, 725, 552, 553
See application file for complete search history.

(56) References Cited

U.S. PATENT DOCUMENTS

| | | | |
|---|---|---|---|
| 7,817,816 B2 | 10/2010 | Wang et al. | |
| 8,446,364 B2 * | 5/2013 | Solomon ............... | G06F 3/0383 345/156 |
| 8,913,003 B2 | 12/2014 | Grunnet-Jepsen et al. | |

(Continued)

*Primary Examiner* — Paulos M Natnael
(74) *Attorney, Agent, or Firm* — Finch & Maloney PLLC

(57) ABSTRACT

Techniques are disclosed that can be implemented as a system configured for image matching-based pointing and/or selection from information presented in an image displayed by a projection device. A pointing device configured as described herein may be pointed at a target portion of an image displayed by a projection device and allowed to capture an image inclusive of that target portion. In turn, the captured image data may be compared with data pertaining to the original displayed image. The resultant pointing location data can be used to generate one or more pointing indicators within the original image, and the projection device may display the resultant annotated image on screen, in some cases in real time and/or with precision resolution of a single pixel. A subsequent user selection can be made based on the known location of the pointing indicator. The techniques provide for more native human-machine interaction than existing approaches.

20 Claims, 11 Drawing Sheets

(51) Int. Cl.
   *G06F 3/0346* (2013.01)
   *G06F 3/0354* (2013.01)

(56) References Cited

U.S. PATENT DOCUMENTS

| | | | |
|---|---|---|---|
| 8,970,696 | B2 | 3/2015 | Xiong |
| 8,982,050 | B2 * | 3/2015 | Solomon ............... G06F 3/0346 345/156 |
| 9,024,876 | B2 * | 5/2015 | Solomon ................ G09G 5/006 345/158 |
| 9,300,893 | B2 * | 3/2016 | Tchigevsky .......... H04N 5/4403 |
| RE46,108 | E * | 8/2016 | Ohnishi |
| 2005/0240376 | A1 * | 10/2005 | Uwatoko ............... G03G 15/55 702/183 |
| 2006/0007318 | A1 * | 1/2006 | Kanayama ......... H04N 1/00212 348/211.3 |
| 2009/0046146 | A1 | 2/2009 | Hoyt |
| 2009/0148036 | A1 * | 6/2009 | Aoyama ................. G06T 5/006 382/154 |
| 2010/0188333 | A1 | 7/2010 | Capps |
| 2011/0085211 | A1 | 4/2011 | King et al. |
| 2011/0227827 | A1 | 9/2011 | Solomon et al. |
| 2011/0254764 | A1 | 10/2011 | Kimoto et al. |
| 2011/0267267 | A1 | 11/2011 | Hasegawa et al. |
| 2012/0008829 | A1 * | 1/2012 | Hao ....................... G03B 17/54 382/103 |
| 2012/0144458 | A1 * | 6/2012 | Mechaley, Jr. ......... G06F 21/35 726/5 |
| 2012/0223883 | A1 | 9/2012 | Solomon |
| 2013/0291081 | A1 * | 10/2013 | Mechaley, Jr. ....... H04W 12/06 726/7 |
| 2014/0062881 | A1 | 3/2014 | Solomon et al. |
| 2015/0062013 | A1 | 3/2015 | Solomon et al. |
| 2015/0271433 | A1 | 9/2015 | Tchigevsky |

\* cited by examiner

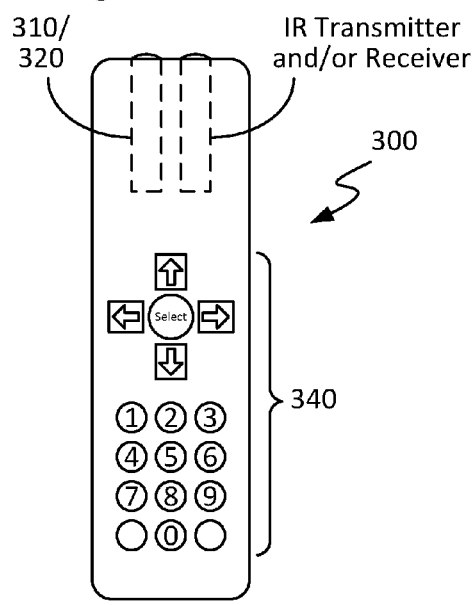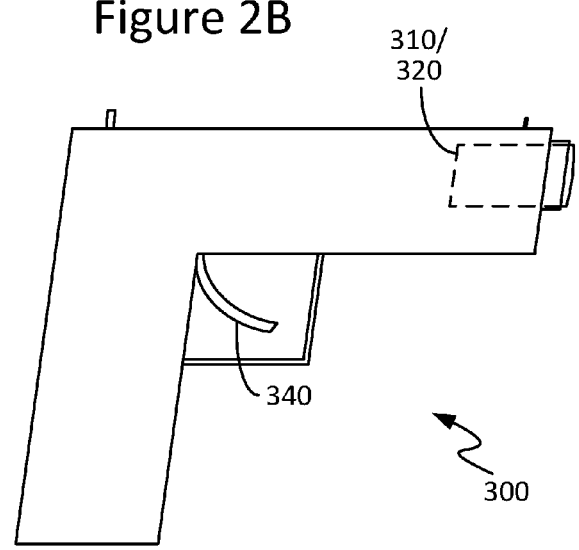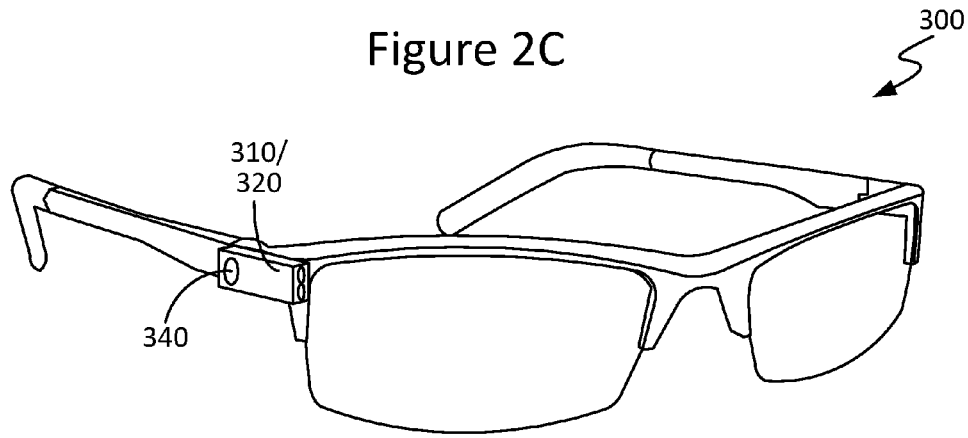

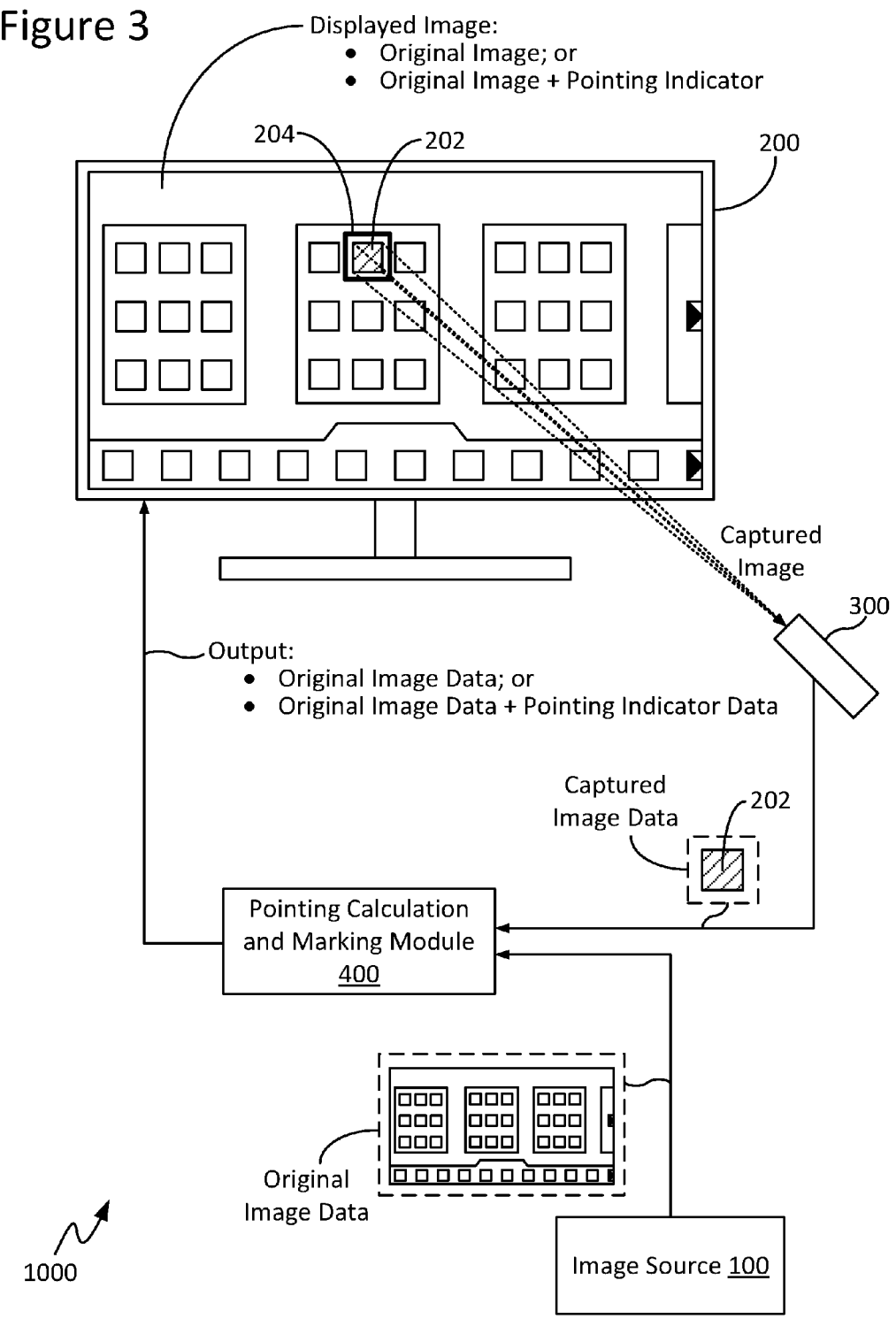

IMAGE MATCHING-BASED POINTING TECHNIQUES

RELATED APPLICATION

This application is a continuation of U.S. application Ser. No. 14/223,739 filed Mar. 24, 2014 (now U.S. Pat. No. 9,300,893), which is herein incorporated by reference in its entirety.

BACKGROUND

Today's computing technology typically includes any number of man-machine interfaces. Such interfaces generally allow a user to point and select something on the display of the computing system. Multiple solutions exist, such as a touchscreen, mouse, trackball, and the Kinect interface by Microsoft, just to name a few. Actual pointing devices can vary in form factor from a stick-like pointer, similar to laser pointer used for presentations, to so-called smart glasses, which allow a user to make selections by simply looking at a specific place on display screen. In any such cases, the user effectively points to an appropriate area on the screen, and the computing system recognizes where the user points and then can act accordingly. In response to the user's pointing, the computing system can highlight the pointed area to give feedback to the user. A select/activate mechanism is usually provided as well (e.g., as pointing may not be enough for most usages), which can be a button or other mechanism (e.g., voice recognition is a possible example for smart glasses).

BRIEF DESCRIPTION OF THE DRAWINGS

FIGS. 2A-2C illustrate several example physical forms for a pointing device configured in accordance with some embodiments of the present disclosure.

FIG. 3 illustrates an example system configured in accordance with an embodiment of the present disclosure.

DETAILED DESCRIPTION

Figure 1A:
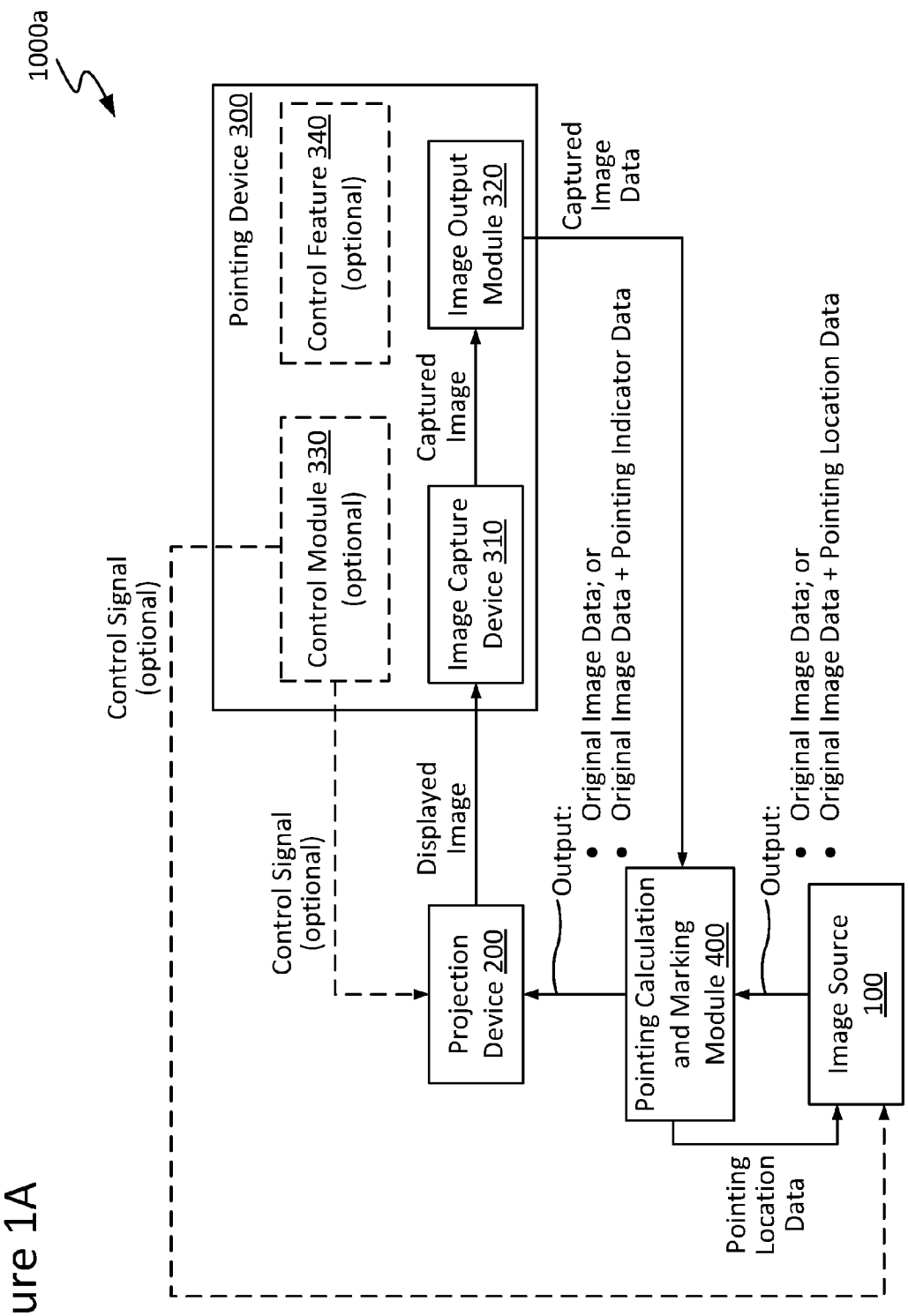
FIGS. 1A-1F are block diagrams illustrating several systems configured in accordance with some embodiments of the present disclosure.

Techniques are disclosed that can be implemented as a system configured for image matching-based pointing and/or selection from information presented in an image displayed by a projection device, such as a television or computer system. In accordance with some embodiments, a pointing device configured as described herein may be pointed at a target portion of an image displayed by a projection device and allowed to capture an image inclusive of that target portion. In turn, the captured image data may be compared with data pertaining to the original image displayed by the projection device. The resultant pointing location data can be used to generate one or more pointing indicators (e.g., cursor, highlighting, or other indicator) within the original image, and the projection device may display the resultant annotated image on screen, in some cases in real time and/or with precision resolution of a single pixel. A subsequent user selection can be made based on the known location of the pointing indicator. The techniques provide for more native human-machine interaction than existing approaches. Numerous configurations and variations will be apparent in light of this disclosure.

As generally used herein, an "original image" refers to an image displayed by a computing system prior to any user input or annotation, and an "annotated image" refers to an original image after it has been annotated based on user input. In addition, a "captured image" refers to an image of an original image that is captured by a camera or other suitable image capture device.

General Overview

As previously noted, there are a number of human-machine interfacing mechanisms. Such interfaces generally involve a number of non-trivial challenges, such as those with respect to pointing and selection on screen. In particular, difficulties exist with respect to pointing precision, ease of use, and a challenging operational learning curve. Some existing approaches to human-machine interfacing utilize additional costly system components that require special placement around the projection device.

Thus, and in accordance with some embodiments of the present disclosure, techniques are disclosed that can be implemented as a system configured for image matching-based pointing and (optionally) selection from information presented in an image displayed by a projection device. In accordance with some embodiments, a pointing device configured as described herein may be pointed at a target portion of an image displayed by a projection device. A camera is provided within the pointing device to capture an image inclusive of that target portion. In turn, the captured image data is made available for comparison with data pertaining to the original image displayed by the projection device. The comparison allows the target portion of the original image to be identified, in the form of pointing location data. The resultant pointing location data can be used to generate one or more pointing indicators within the original image, and the projection device may display the resultant annotated image on screen. A subsequent user selection can be made based on the known location of the pointing indicator. This annotation can be carried out in real time, so as to provide the user timely feedback with respect to that user's movement of the pointing device with respect to the displayed image. Likewise, the selection can be carried out in real time with respect to the user's selection indication via the pointing device. In some embodiments, the annotation can be provided with precision resolution of a single pixel, although such precision is not required. The techniques provide for more native human-machine interaction than existing approaches.

Some embodiments may exploit existing componentry, such as may be found in a typical television or set-top box (STB) remote control or in a typical television or computer display. Thus, in some cases, a system configured as described herein may not require any additional components to be specially placed around the projection device, contrary to existing approaches. Some embodiments may be amenable to use in a computer-based system in which multiple pointing devices may be available, and as such, the pointing device may be presented as another pointing source.

Some embodiments can be used with image sources, such as, for example: a desktop computer (e.g., an all-in-one desktop); a laptop/notebook computer; a tablet computer; a mobile phone or smartphone; a digital versatile disc (DVD) player; a Blu-Ray disc player; a set-top box (STB); a gaming platform or handheld gaming device; a personal digital assistant (PDA); a media player device; and/or any other consumer electronics device, as will be apparent in light of this disclosure. Some embodiments can be used with projection devices, such as, for example: a television (e.g., smart television); a projector; a cinema screen; a computer monitor or other computer display; a laptop/notebook computer display; a tablet computer display; a mobile phone or smartphone display; a personal digital assistant (PDA) display; media player device display; and/or any other electronic visual display, as will be apparent in light of this disclosure. Numerous suitable uses and applications will be apparent in light of this disclosure.

In some instances, a system provided using the disclosed techniques can be configured, for example, as: (1) a partially/completely assembled system; and/or (2) a kit or other collection of discrete components (e.g., image source, pointing calculation module, marking module, projection device, pointing device, etc.) which may be operatively coupled as desired. Also, in accordance with some embodiments, use of the disclosed techniques may be detected, for example, by visual and/or performance inspection of a given projection device, image source, and/or pointing device that utilizes image analysis and processing techniques provided herein.

System Architectures and Operation

FIGS. 1A-1F are block diagrams illustrating systems 1000a-1000f configured in accordance with some embodiments of the present disclosure. For consistency and ease of understanding of the present disclosure, systems 1000a-1000f hereinafter may be collectively referred to as a system 1000, except where separately enumerated.

As can be seen from the figures, system 1000 includes an image source 100. Image source 100 may be any device, mobile or otherwise, configured to output an image signal. Some example suitable image sources 100 may include: a desktop computer; a laptop/notebook computer; a tablet computer; a mobile phone or smartphone; a digital versatile disc (DVD) player; a Blu-Ray disc player; a set-top box (STB); a gaming platform or handheld gaming device; a personal digital assistant (PDA); and/or a media player device. In accordance with some embodiments, image source 100 may be (or otherwise include) memory/storage, a central processing unit (CPU), an accelerated processing unit (APU), and/or a graphics processing unit (GPU) of a computing device, for example.

Image source 100 may be configured, in accordance with some embodiments, to output an image signal including: (1) original image data pertaining to an original image to be displayed using projection device 200 (discussed below); and/or (2) pointing location data pertaining to a pointing indicator with which an original image is to be annotated for display using projection device 200, as discussed herein. As can be seen from FIG. 1A, in some cases, image source 100 may output its image signal to a downstream pointing calculation and marking module 400, discussed below. In some such cases, pointing calculation and marking module 400 may output its image signal, in turn, to downstream projection device 200. It should be noted, however, that the present disclosure is not so limited, as in some other embodiments, image source 100 may be configured to output its image signal directly to projection device 200 without an intervening pointing calculation and marking module 400, as can be seen from FIG. 1B. To these ends, image source 100 can be configured, in accordance with some embodiments, for wired (e.g., Universal Serial Bus or USB connection; Ethernet connection; FireWire connection; etc.) and/or wireless (e.g., Wi-Fi connection; Bluetooth connection; etc.) communication. Other suitable types and configurations for image source 100 will depend on a given application and will be apparent in light of this disclosure.

Also, as can be seen from the figures, system 1000 includes a projection device 200. Projection device 200 may be any electronic visual display or other device configured to display or otherwise generate an image (e.g., image, video, text, and/or other displayable content) from an image signal received thereby. Some example suitable projection devices 200 may include: a television (e.g., smart television or otherwise); a projector; a cinema screen; a computer monitor or other computer display; a laptop/notebook computer display; a tablet computer display; a mobile phone or smartphone display; a personal digital assistant (PDA) display; and/or a media player device display.

In some embodiments, projection device 200 may be a stand-alone component that may be communicatively coupled with image source 100 and/or calculation and marking module 400 (discussed below). For instance, in an example case, image source 100 may be a set-top box, and projection device 200 may be a television communicatively coupled therewith. In some other embodiments, projection device 200 may be integrated, in part or in whole, with image source 100. For instance, in an example case, image source 100 may be a laptop computer, and projection device 200 may be the native display of such laptop computer.

Projection device 200 may be configured, in accordance with some embodiments, to be communicatively coupled with image source 100 and/or pointing calculation and marking module 400. To that end, projection device 200 may be configured to utilize any of the example wired and/or wireless communication techniques noted above with respect to image source 100. In accordance with some embodiments, the image signal received by projection device 200 may include: (1) original image data pertaining to an original image to be displayed using projection device 200; and/or (2) pointing location data pertaining to a pointing indicator with which an original image is to be annotated for display using projection device 200. In turn, projection device 200 may display: (1) the original image; and/or (2) the original image as annotated with one or more pointing indicators. Other suitable types and configurations for projection device 200 will depend on a given application and will be apparent in light of this disclosure.

As can be seen, system 1000 further includes a pointing device 300. In accordance with some embodiments, pointing device 300 may be utilized to: (1) point to a target location within an image displayed by projection device 200; and/or (2) make a selection from information presented in the image displayed by projection device 200. To that end, pointing device 300 may be configured, in accordance with some embodiments, to be communicatively coupleable with image source 100, projection device 200, and/or pointing calculation and marking module 400 using any of the example wired and/or wireless communication techniques noted above with respect to image source 100.

In accordance with some embodiments, an image capture device 310 may be integrated, in part or in whole, with pointing device 300. Image capture device 310 can be any device configured to capture digital images, such as a still camera (e.g., a camera configured to capture still photographs) or a video camera (e.g., a camera configured to capture moving images comprising a plurality of frames). In some cases, image capture device 310 may include components such as, but not limited to, an optics assembly, an image sensor, and/or an image/video encoder. These components (and others, if any) of image capture device 310 may be implemented in any combination of hardware, software, and/or firmware, as desired for a given target application or end-use. Image capture device 310 can be configured to operate using light, for example, in the visible spectrum or with other portions of the electromagnetic spectrum not limited to the infrared (IR) spectrum, ultraviolet (UV) spectrum, etc. In some instances, image capture device 310 may be configured to continuously acquire imaging data.

Image capture device 310 may be configured, in accordance with some embodiments, to capture an image inclusive of at least a portion of the image displayed by projection device 200 when aimed (e.g., oriented and focused) thereat. The area of capture provided by image capture device 310 can be customized, as desired for a given target application or end-use. For instance, in some cases, the area of capture may be smaller than (e.g., may cover only a portion of) the image displayed by projector device 200. In some such instances, this may help to reduce the amount of imaging data to be analyzed and/or processed by system 1000, and thus reduce taxing of the various communication and processing resources thereof. In some other cases, the area of capture may be larger than (e.g., may cover the entirety of) the image displayed by projector device 200. In some such instances, this may facilitate matching between the original image data and the captured image data, for example, in cases in which the displayed image has repeated portions. As discussed herein, the image captured by image capture device 310 may be subjected to downstream analysis and/or processing, in accordance with some embodiments. Thus, it may be desirable, in some instances, to ensure that image capture device 310 is of adequate resolution to that end. Other suitable types and configurations for image capture device 310 will be apparent in light of this disclosure.

In accordance with some embodiments, an image output module 320 may be integrated, in part or in whole, with pointing device 300. Image output module 320 may be configured, in accordance with some embodiments, to receive the image captured by upstream image capture device 310 and to transmit or otherwise output captured image data for downstream analysis and/or processing (e.g., by pointing calculation and marking module 400, discussed herein). To that end, image output module 320 may be configured, in accordance with some embodiments, to be communicatively coupleable with image source 100, projection device 200, and/or pointing calculation and marking module 400 using any of the example wired and/or wireless communication techniques noted above with respect to image source 100. In some cases, image output module 320 may be configured to output the captured image data for downstream analysis and/or processing in real time. It should be noted, however, that the present disclosure is not so limited, as in some other embodiments, image capture device 310 may deliver captured image data directly to pointing calculation and marking module 400 without an intervening image output module 320. Thus, in this sense, image output module 320 may be considered an optional component. Other suitable types and configurations for image output module 320 will depend on a given application and will be apparent in light of this disclosure.

In some embodiments, pointing device 300 optionally may include a control module 330. Optional control module 330 may be configured, in accordance with some embodiments, to output one or more control signals that may be utilized, for example, in: (1) remotely adjusting the operation/performance of image source 100 and/or projection device 200; and/or (2) remotely selecting/activating a given function of image source 100 and/or projection device 200. For instance, in some cases, optional control module 330 may output a control signal to projection device 200 to remotely control various parameters (e.g., color, sharpness, picture size, contrast, etc.) and/or functions (e.g., selection of a given image source 100 if multiple sources are present; turning projection device 200 on/off; etc.) thereof. In some cases, optional control module 330 may be configured to provide a control signal to image source 100 to remotely control various parameters (e.g., playback resolution, streaming options, volume settings, etc.) and/or functions (e.g., select, back, play/pause/stop, save, favorite, etc.) thereof. In a more general sense, optional control module 330 may be configured to output control signals for remote activation of a given functionality and/or remote adjustment of the performance of any given portion of system 1000 using pointing device 300, in accordance with some embodiments. Thus, in a sense, pointing device 300 may be considered a remote control device, in some instances.

To these ends, optional control module 330 may be configured to communicate using any of the example wired and/or wireless communication techniques noted above with respect to image source 100. In some embodiments, a given control signal may be transmitted from control module 330 using transmitter componentry and/or receiver componentry (e.g., transceiver componentry) optionally included with pointing device 300. When included, such transmitter/receiver componentry may be configured for communication using radio frequency (RF) signals, infrared (IR) signals, and/or any other suitable signal, as will be apparent in light of this disclosure. Other suitable configurations and capabilities for optional control module 330 will depend on a given application and will be apparent in light of this disclosure.

In accordance with some embodiments, pointing device 300 optionally may include one or more control features 340, for example, to aid a user in utilizing pointing device 300 in controlling/operating image source 100 and/or projection device 200 (e.g., via control signals output by optional control module 330). To that end, a given control feature 340 may be associated with any standard and/or user-defined function, capability, or application, as desired for a given target application or end-use. In some instances, a given optional control feature 340 may be configured to be used in selection of a given option presented in the image displayed by projection device 200, as described herein.

A given control feature 340 may have any of a wide range of configurations. For example, in some cases, a given control feature 340 may be a physical control feature (e.g., a physical button, switch, knob, pressure sensor, toggle, slider, etc.) that a user may manipulate manually. In some cases, a given control feature 340 may be a virtual control feature (e.g., a virtual button, switch, dial, toggle, slider, etc.) that a user may activate. In some still other cases, a given control feature 340 may be a voice-activated control feature (e.g., provided using an audible input/voice recognition device and software) or a gesture-activated control feature (e.g., provided using a gesture recognition device and software) that a user may utilize. Other suitable configurations and capabilities for optional control feature(s) 340 will depend on a given application and will be apparent in light of this disclosure.

The physical form/configuration of pointing device 300 may be customized as desired for a given target application or end-use. For example, in some embodiments, pointing device 300 may be configured like a remote control typically associated with televisions and set-top boxes (STBs), as generally shown in FIG. 2A. In such cases, a user may point the pointing device 300 at a target location within the image displayed by projection device 200, and system 1000 may effectuate marking (e.g., with a pointing indicator) and/or selection thereof, in accordance with some embodiments. Also, in some cases, infrared (IR) optoelectronic transmitter/receiver componentry typically present in such remote control types optionally may be utilized, in accordance with some embodiments, in delivering control signal(s) to one or more portions of system 1000, as previously noted.

In some other embodiments, pointing device 300 may be configured, for example, like a zapper/firearm-type game controller (e.g., as may be utilized for first-person shooter video games), as generally shown in FIG. 2B. In such cases, a user may aim the pointing device 300 at a target location within the image displayed by projection device 200, and system 1000 may effectuate marking (e.g., with a pointing indicator) and/or selection thereof, in accordance with some embodiments.

In some other embodiments, pointing device 300 may be configured, for example, to be affixed to or otherwise integrated with a pair of eyeglasses, as generally shown in FIG. 2C. In such cases, a user wearing pointing device 300 may look at a target location within the image displayed by projection device 200, and system 1000 may effectuate marking (e.g., with a pointing indicator) and/or selection thereof, in accordance with some embodiments.

In some still other embodiments, pointing device 300 may be configured, for example, like a laser pointer or other stick-type pointer, which a user may aim at a target location within the image displayed by projection device 200 to effectuate marking (e.g., with a pointing indicator) and/or selection thereof by system 1000, in accordance with some embodiments. Numerous other suitable physical forms and configurations for pointing device 300 will be apparent in light of this disclosure.

As previously noted, the image captured by image capture device 310 may be provided for downstream analysis and/or processing. For example, in accordance with some embodiments, the captured image data may be utilized in performing one or more pointing calculations, as described herein. Also, the captured image data may be utilized, in accordance with some embodiments, in annotating the original image data with one or more pointing indicators, as described herein. In some instances, adjustment of the image signal to include a pointing indicator may be performed in real time. In some instances, adjustment of the image signal to include a pointing indicator may be performed with a precision resolution of a single pixel.

To these ends, a pointing calculation and marking module 400 may be included, in accordance with some embodiments. Generally, pointing calculation and marking module 400 may be configured to operate on the imaging data (e.g., original image data, captured image data, etc.) during its flow through system 1000.

Pointing calculation and marking module 400 may be configured, in accordance with some embodiments, to identify where pointing device 300 is pointed with respect to an image displayed by projection device 200. To that end, pointing calculation and marking module 400 may include custom, proprietary, known, and/or after-developed image/video processing code or instruction sets that are generally well-defined and operable to: (1) compare captured image data received from pointing device 300 with original image data received from image source 100; and (2) determine from such comparison the target location where pointing device 300 is pointing with respect to the image displayed by projection device 200. In accordance with some embodiments, pointing calculation and marking module 400 may utilize one or more edge detection processes to make such a determination. In accordance with some embodiments, pointing calculation and marking module 400 may utilize one or more pixel comparison processes to make such a determination. In accordance with some embodiments, pointing calculation and marking module 400 may utilize a process that matches the center of the captured image with a specific location within the image displayed by projection device 200. Other suitable image matching processes which may be employed by pointing calculation and marking module 400 will depend on a given application and will be apparent in light of this disclosure. Pointing calculation and marking module 400 may output the pointing location data (e.g., pointing direction, pointing orientation, etc.) resulting from comparison of the captured image data against the original image data to image source 100, in accordance with some embodiments.

In accordance with some embodiments, pointing calculation and marking module 400 may be configured to incorporate into the original image data a pointer sign (e.g., pointed area highlight or other marking/indicator) annotating the target pointing location of pointing device 300 with respect to the original image data displayed by projection device 200. To that end, pointing calculation and marking module 400 may include custom, proprietary, known, and/or after-developed image/video processing code or instruction sets that are generally well-defined and operable to incorporate pointing location data into an image signal to be displayed by a projection device 200. Consequently, one or more pointing indicators may be displayed on-screen within the image displayed by projection device 200, as described herein. Refreshing of a given pointing indicator can be made continually or periodically, as desired for a given target application or end-use. In some instances, refreshing of a given pointing indicator may be performed in real time. In some cases, a given pointing indicator may be generated and/or refreshed with a precision resolution of a single pixel.

Pointing calculation and marking module 400 can be implemented, for example, in any suitable programming language, such as C, C++, objective C, JavaScript, custom or proprietary instruction sets, etc. The module can be encoded, for example, on a machine-readable medium that, when executed by a processor, carries out the desired functionality of that portion of pointing calculation and marking module 400. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chipset or other such purpose-built logic. Some embodiments can be implemented with a microcontroller having input/output capability (e.g., inputs for receiving user inputs; outputs for directing other components) and a number of embedded routines for carrying out a given desired functionality. In a more general sense, pointing calculation and marking module 400 can be implemented in hardware, software, and/or firmware, as desired.

In some embodiments, pointing calculation and marking module 400 may output an image signal to downstream projection device 200, as can be seen from FIG. 1A, for example. In some other embodiments, pointing calculation and marking module 400 may output an image signal to image source 100, as can be seen from FIG. 1B, for example.

Figure 1B:
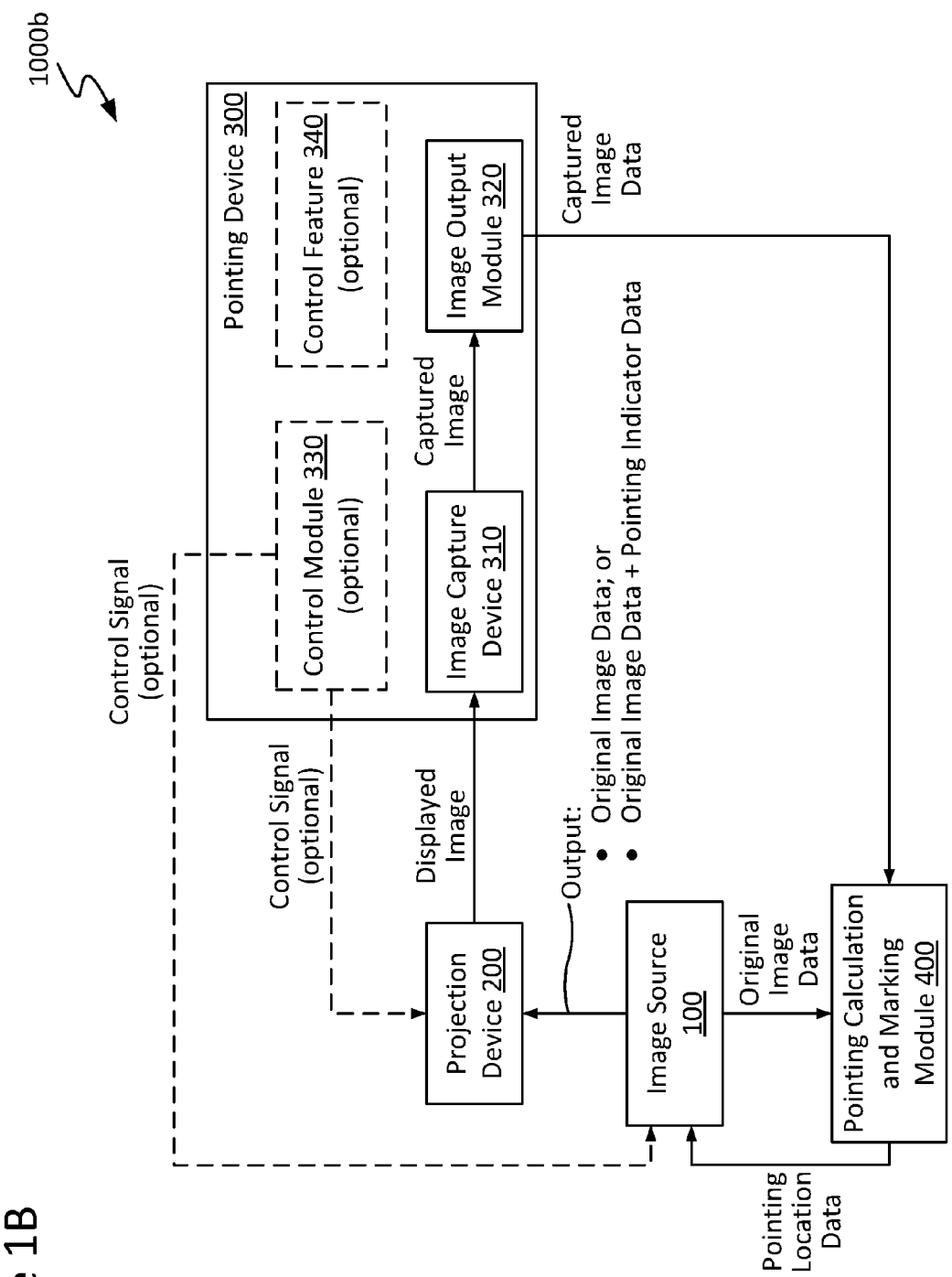

In accordance with some embodiments, pointing calculation and marking module 400 can be a stand-alone component (e.g., as generally shown in systems 1000a and 1000b of FIGS. 1A and 1B, respectively). However, the present disclosure is not so limited. For example, in accordance with some other embodiments, pointing calculation and marking module 400 may be integrated, at least in part, into image source 100. In an example case, image source 100 may be a set-top box (STB) or other media player (e.g., DVD player, Blu-Ray disc player, etc.). In another example case, image source 100 may be a computing device having a graphics chipset in which the pointing calculation and marking module 400 may be implemented. In some other embodiments, pointing calculation and marking module 400 may be integrated, at least in part, into projection device 200. In an example case, projection device 200 may be a smart television including an integrated pointing calculation and marking module 400. In some still other embodiments, both projection device 200 and pointing calculation and marking module 400 may be integrated, in part or in whole, into image source 100, as is generally shown in system 1000f of FIG. 1F. In an example case, image source 100 may be a laptop/notebook computer having a native computer screen that serves as projection device 200 and an on-board pointing calculation and marking module 400. In another example case, image source 100 may be a television (e.g., smart television) having a native display screen that serves as projection device 200 and an on-board pointing calculation and marking module 400, and pointing device 300 may be a remote control for that television. Thus, in a sense, such a television may serve as a combined image source 100 and projection device 200, in accordance with an example embodiment.

Also, it should be noted that the pointing calculation and marking functions described herein are not so limited only to implementation via a pointing calculation and marking module 400, as in a more general sense, pointing calculation and marking module 400 may have any degree of functional distributedness, as desired for a given target application or end-use. As such, pointing calculation may be performed by a pointing calculation module 400a, and marking may be performed by a separate marking module 400b, in accordance with some embodiments.

Figure 1C:
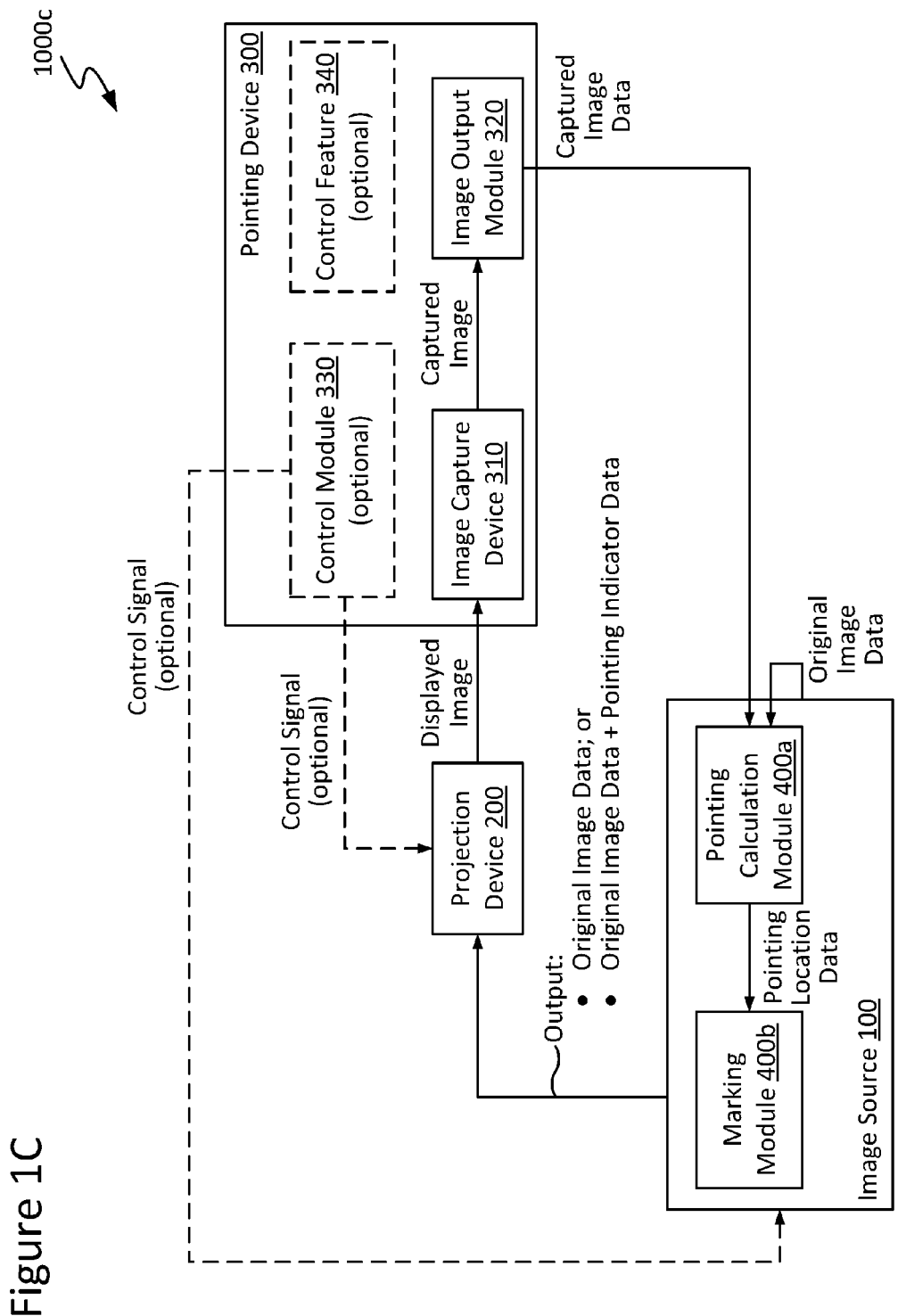
Figure 1D:
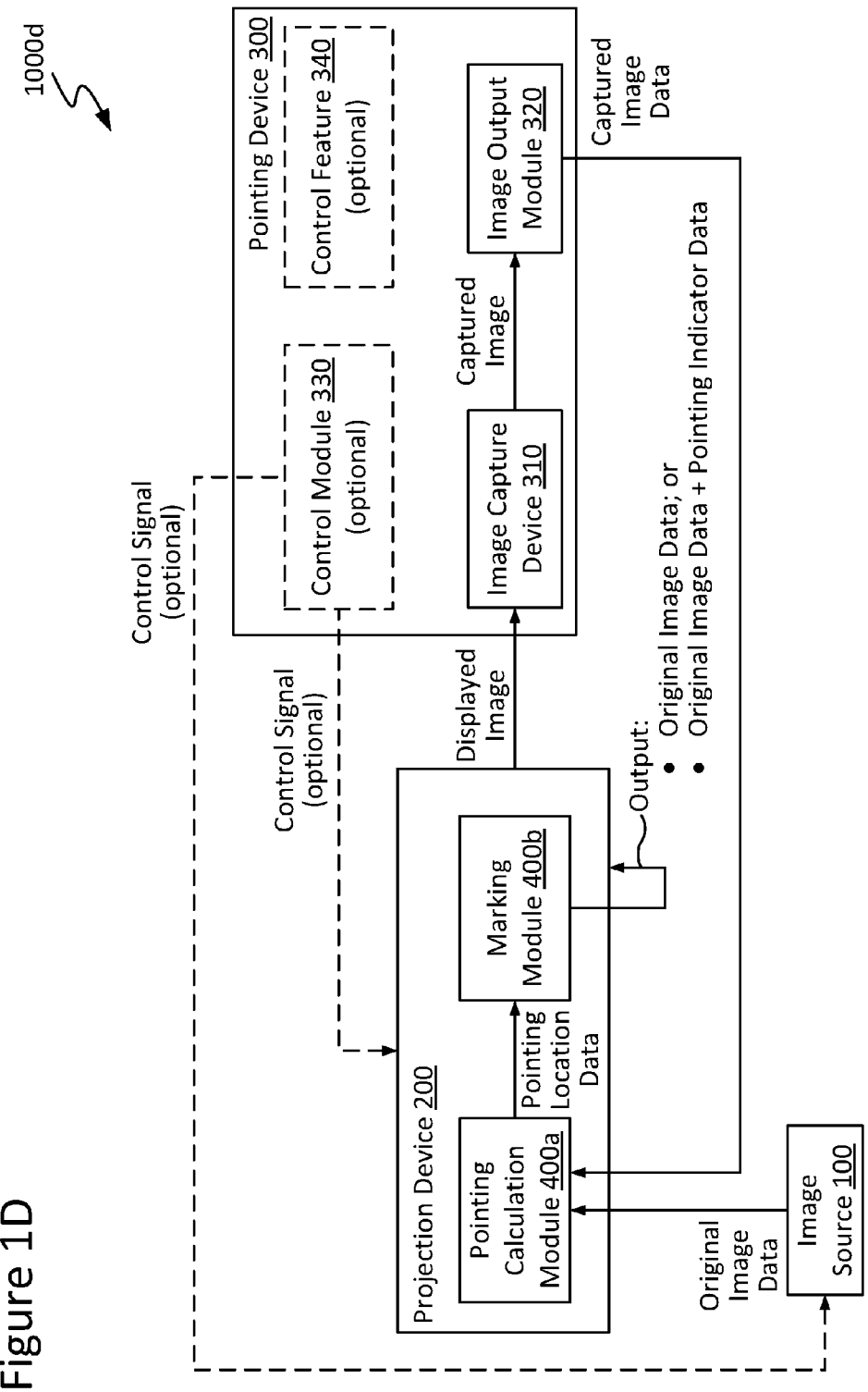
Figure 1E:
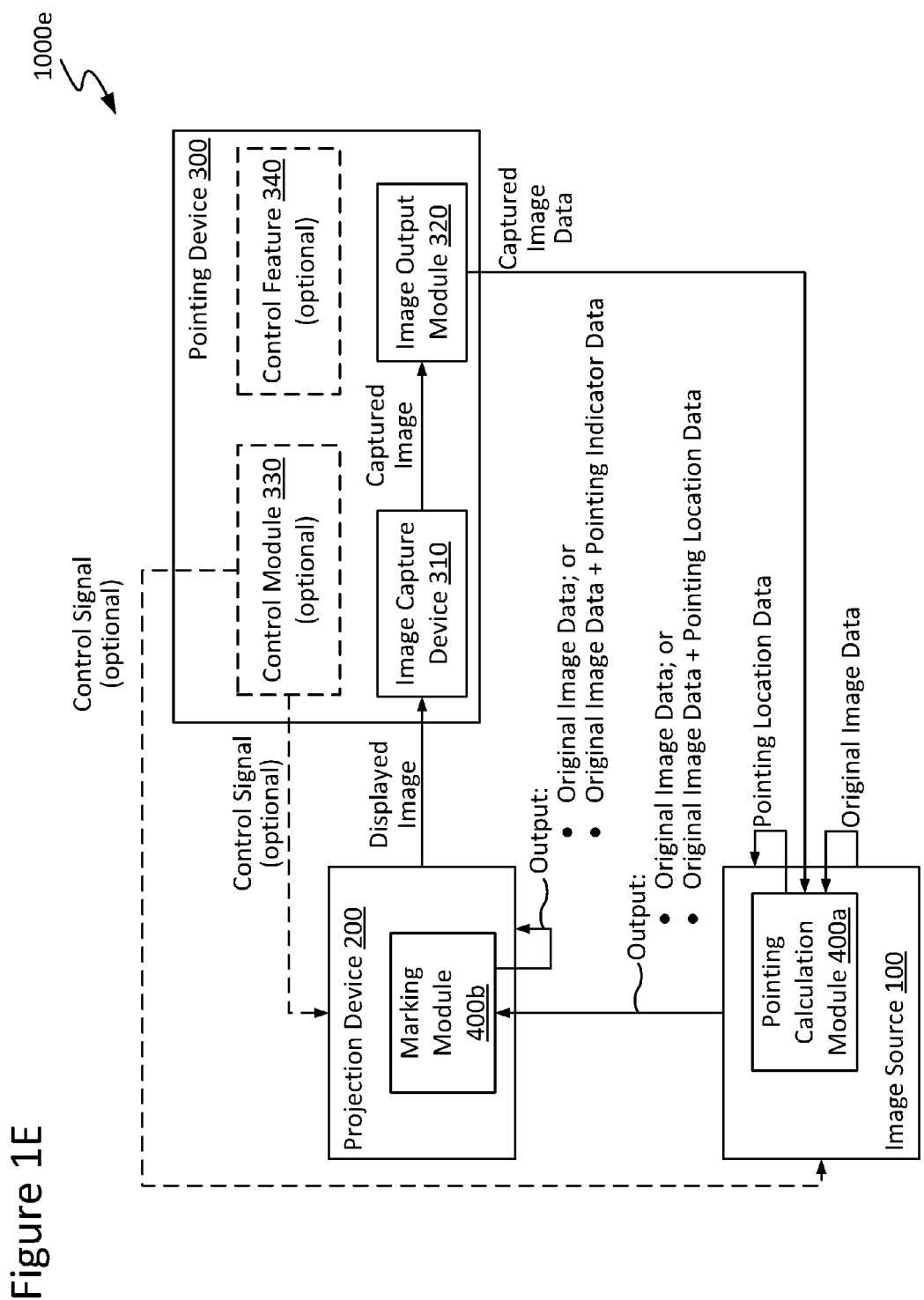
Figure 1F:
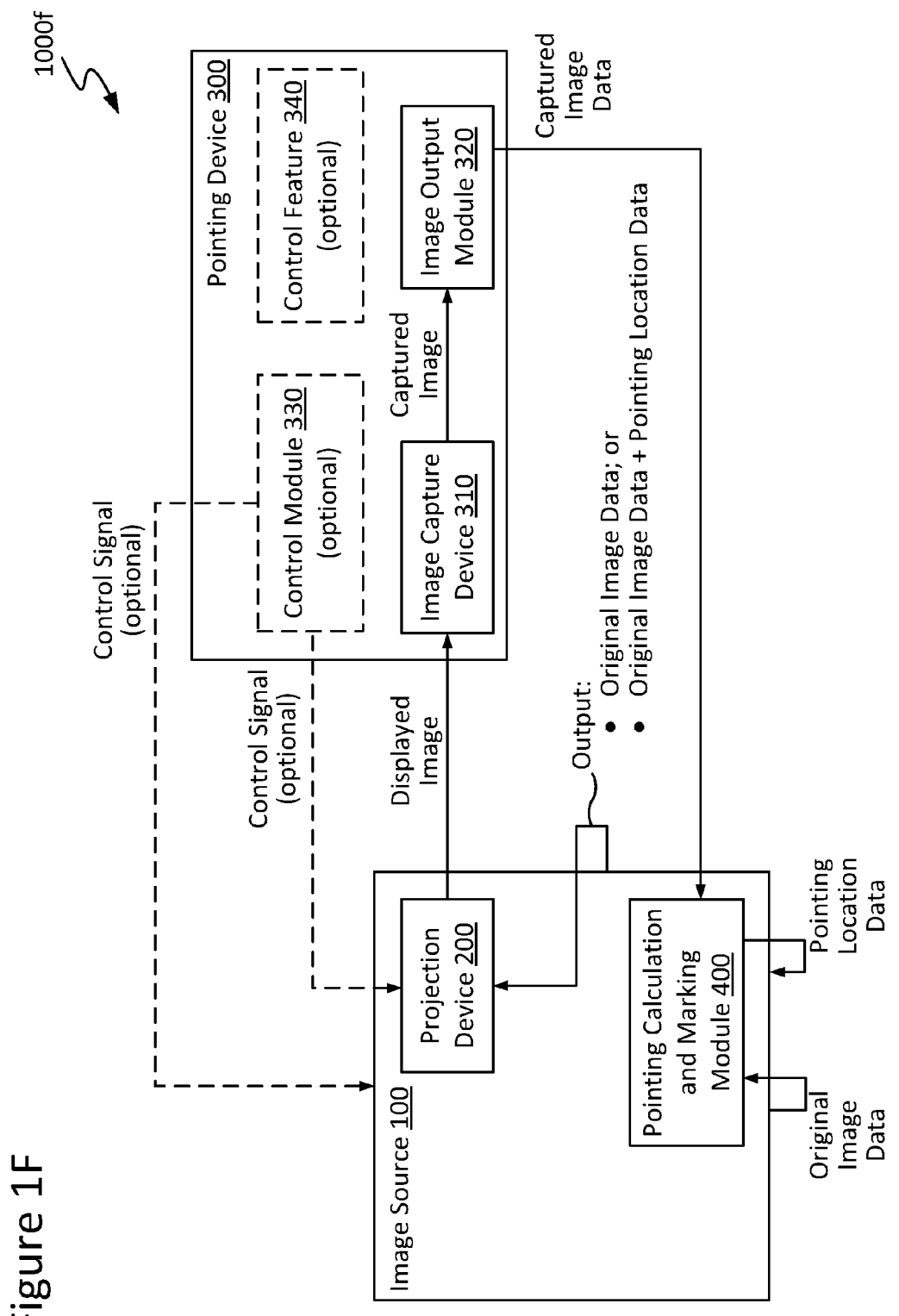

For instance, as can be seen from system 1000c of FIG. 1C, a pointing calculation module 400a and a separate marking module 400b may be implemented in image source 100, in accordance with some embodiments. Thus, in some such cases, image matching and/or pointer marking may occur within image source 100. In some such cases, the graphics processing unit (GPU) or other graphics componentry of image source 100 may be utilized to that end. As can be seen from system 1000d of FIG. 1D, a pointing calculation module 400a and a separate marking module 400b may be implemented in projection device 200, in accordance with some embodiments. Thus, in some such cases, image matching and/or pointer marking may occur within projection device 200. As can be seen from system 1000e of FIG. 1E, a pointing calculation module 400a may be implemented in image source 100, whereas a separate marking module 400b may be implemented in projection device 200, in accordance with some embodiments. Thus, in some such cases, image matching may occur within image source 100, and pointer marking may occur separately within projection device 200. In some instances, a pointing calculation module 400a and a separate marking module 400b both may be implemented in an image source 100, with which a projection device 300 is integrated (e.g., such as the image source 100 and native projection device 200 of system 1000f of FIG. 1F).

In any such cases of functional distributedness, pointing calculation module 400a and/or marking module 400b can be implemented, for example, in any suitable programming language, such as C, C++, objective C, JavaScript, custom or proprietary instruction sets, etc. The modules can be encoded, for example, on a machine-readable medium that, when executed by a processor, carries out the desired functionality of that portion of pointing calculation module 400a and/or marking module 400b. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chipset or other such purpose-built logic. Some embodiments can be implemented with a microcontroller having input/output capability (e.g., inputs for receiving user inputs; outputs for directing other components) and a number of embedded routines for carrying out a given desired functionality. In a more general sense, pointing calculation module 400a and/or marking module 400b can be implemented in hardware, software, and/or firmware, as desired. Numerous configurations for pointing calculation module 400a and/or marking module 400b will be apparent in light of this disclosure.

FIG. 3 illustrates an example system 1000 configured in accordance with an embodiment of the present disclosure. In this example system 1000, image source 100 outputs an image signal including data pertaining to an original image (e.g., a menu screen or other suitable image) to be displayed by downstream projection device 200. En route to projection device 200, the image signal of image source 100 passes through pointing calculation and marking module 400. Projection device 200 displays an image generated, at least in part, from the original image data provided by upstream image source 100. A pointing device 300 aimed at a target portion 202 of the image displayed by projection device 200 captures, at least in part, an image of that target portion 202. The resultant captured image data, including data pertaining to target portion 202, is then delivered to pointing calculation and marking module 400. In turn, pointing calculation and marking module 400 compares the captured image data with the original image data to determine where pointing device 300 is pointing with respect to the image currently displayed by projection device 200 (e.g., where target portion 202 is located within the displayed image). Thereafter, pointing calculation and marking module 400 outputs an image signal including data pertaining to the original image as well as the target location 202 where a pointing indicator is to be drawn with respect to the image currently displayed by projection device 200. In turn, projection device 200 displays an image generated from the original image data and pointing indicator data, the displayed image including the original image (e.g., menu screen or other suitable image) annotated with a pointing indicator 204 (e.g., highlighted box or other suitable indicator).

As previously discussed, if pointing calculation and marking module 400 determines that pointing device 300 is pointed at the image displayed by projection device 200, then it may output pointing location data, which may be utilized in imparting a pointing indicator to the original image for display by projection device 200. If instead pointing calculation and marking module 400 determines that pointing device 300 is not pointed at the image displayed by projection device 200, then it may forego output of any pointing location data, and projection device 200 may continue to display the original image provided by image source 100.

Also, as previously discussed, a user may utilize pointing device 300 in making a selection from one or more options presented by the image displayed by projection device 200. To that end, a user may utilize one or more optional control features 340, in accordance with some embodiments. Thus, as will be appreciated in light of this disclosure, it may be desirable, in some instances, to provide a user with one or more forms of feedback while utilizing pointing device 300 to interact with (e.g., point at and/or select from) on-screen options displayed by projection device 200. For instance, one or more types of feedback may be provided to inform the user that a selection has been made, or an action has been performed, or a mode has been switched.

To that end, system 1000 may be configured, in some embodiments, to provide a user with visual feedback. For example, the target portion of the displayed image at which pointing device 300 is pointed may be highlighted, encircled, altered in color or size, or otherwise changed to signify to the user that the pointing device 300 is currently pointed at that portion of the displayed image and/or that activation of a given option has occurred. The present disclosure is not so limited only to visual feedback, however, as some embodiments additionally or alternatively may utilize aural feedback, haptic feedback, and/or any other type of feedback as will be apparent in light of this disclosure. In any case, the optional feedback componentry of system 1000 may be hosted by pointing device 300, image source 100, and/or projection device 200 and may be customized as desired for a given target application or end-use.

Methodology

Figure 4:
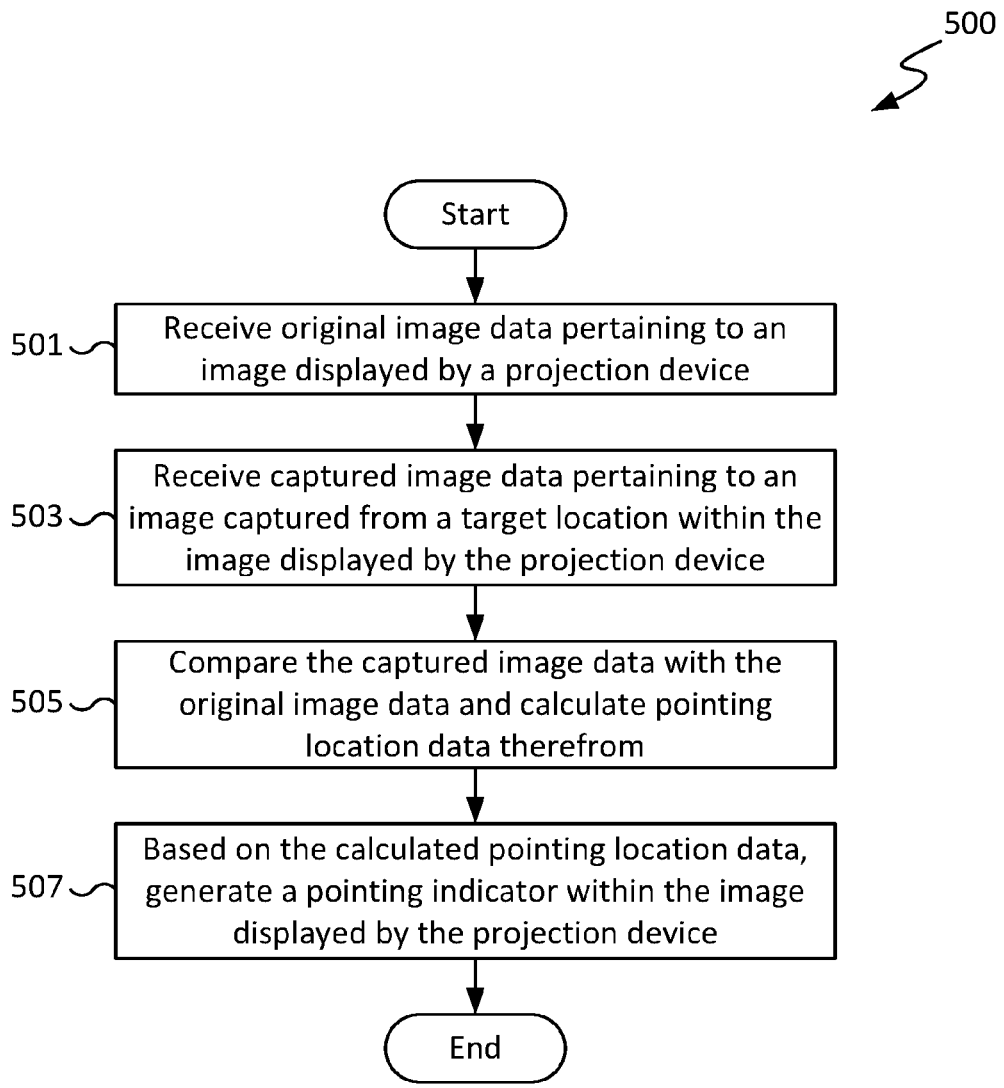
FIG. 4 is a flow diagram illustrating a method of image matching-based pointing in an image displayed by a projection device, in accordance with an embodiment of the present disclosure.

FIG. 4 is a flow diagram illustrating a method 500 of image matching-based pointing in an image displayed by a projection device, in accordance with an embodiment of the present disclosure. As can be seen, the method 500 may begin as in block 501 with receiving original image data pertaining to an image displayed by a projection device 200. As previously discussed, the original image data may be provided by an image source 100, and a pointing calculation and marking module 400 (or a pointing calculation module 400a) may receive the original image data from image source 100, in accordance with some embodiments.

The method 500 may proceed as in block 503 with receiving captured image data pertaining to an image captured from a target location within the image displayed by the projection device 200. As previously discussed, the captured image data may be provided by an image capture device 310 hosted by a pointing device 300, in accordance with some embodiments. In providing the captured image data, the pointing device 300 may be pointed at a target location within the image displayed by the projection device 200, in accordance with some embodiments.

The method 500 may continue as in block 505 with comparing the captured image data with the original image data and calculating pointing location data therefrom. As previously discussed, pointing calculation and marking module 400 (or a pointing calculation module 400a) may employ one or more graphics analysis and/or processing techniques (e.g., edge detection, pixel comparison, matching the center of the captured image with a specific location within the image displayed by projection device 200, etc.) in comparing the captured image data against the original image data, in accordance with some embodiments.

The method 500 may proceed as in block 507 with generating, based on the calculated pointing location, a pointing indicator within the image displayed by the projection device 200. As previously discussed, pointing calculation and marking module 400 (or a marking module 400b) may annotate the image signal with a pointing sign that may be utilized by projection device 200 in generating a displayed image including an on-screen pointing indicator, in accordance with some embodiments. As previously discussed, the pointing indicator may serve, at least in part, to indicate to a user where the pointing device 300 is pointing with respect to the image currently displayed by projection device 200, in accordance with some embodiments.

Numerous variations on this methodology will be apparent in light of this disclosure. As will be appreciated, and in accordance with an embodiment, each of the functional boxes (e.g., 501, 503, 505, and 507) shown in FIG. 4 can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have I/O capacity for soliciting input from a user and providing responses to user requests), and/or hardware (e.g., gate level logic, field programmable gate array, purpose-built silicon, etc.).

Example System

Figure 5:
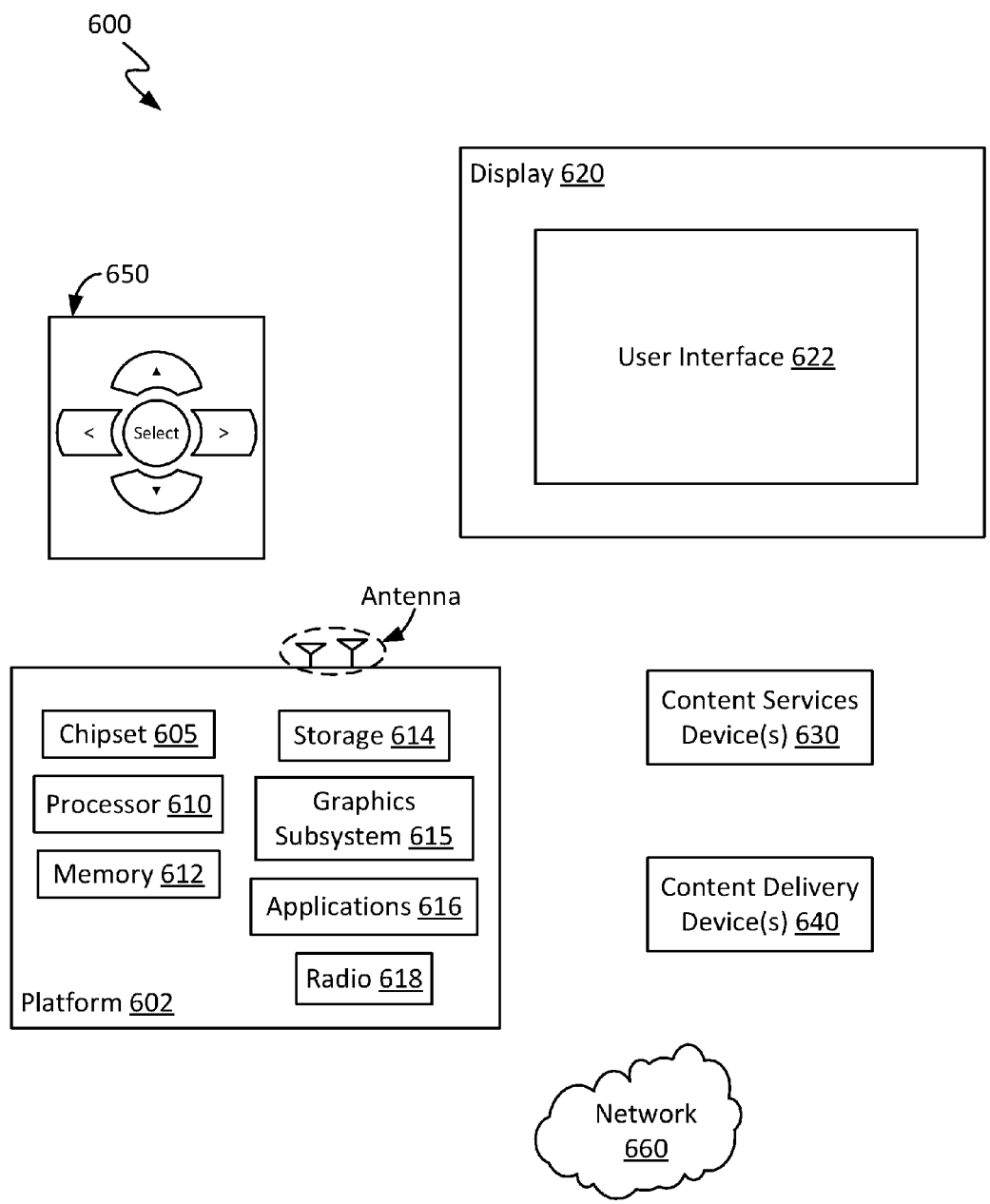
FIG. 5 illustrates an example system that may carry out the techniques for image matching-based pointing and/or selection from information presented in an image displayed by a projection device as described herein, in accordance with some embodiments.

FIG. 5 illustrates an example system 600 that may carry out the techniques for image matching-based pointing and/or selection from information presented in an image displayed by a projection device as described herein, in accordance with some embodiments. In some embodiments, system 600 may be a media system, although system 600 is not limited to this context. For example, system 600 may be incorporated into a personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact, for example, with platform 602 and/or display 620. Each of these example components is described in more detail below.

In some embodiments, platform 602 may comprise any combination of a chipset 605, processor 610, memory 612, storage 614, graphics subsystem 615, applications 616, and/or radio 618. Chipset 605 may provide intercommunication among processor 610, memory 612, storage 614, graphics subsystem 615, applications 616, and/or radio 618.

For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface (HDMI), DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The techniques for image matching-based pointing and/or selection from information presented in an image displayed by a projection device described herein may be implemented in various hardware architectures. For example, the techniques for image matching-based pointing and/or selection from information presented in an image displayed by a projection device as provided herein may be integrated within a graphics and/or video chipset. Alternatively, a discrete security processor may be used. In still another embodiment, the graphics and/or video functions including the techniques for image matching-based pointing and/or selection from information presented in an image displayed by a projection device may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer-type monitor or display. Display 620 may comprise, for example, a liquid crystal display (LCD) screen, electrophoretic display (EPD) or liquid paper display, flat panel display, touchscreen display, television-like device, and/or a television. Display 620 may be digital and/or analog. In some embodiments, display 620 may be a holographic or three-dimensional (3-D) display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international, and/or independent service and thus may be accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer (PC), network, telephone, Internet-enabled devices or appliance capable of delivering digital information and/or content, and any other similar device capable of unidirectionally or bi-directionally communicating content between content providers and platform 602 and/or display 620, via network 660 or directly. It will be appreciated that the content may be communicated unidirectionally and/or bi-directionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the present disclosure. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency (RF) spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the techniques for image matching-based pointing and/or selection from information presented in an image displayed by a projection device as described herein). The embodiments, however, are not limited to the elements or context shown or described in FIG. 5.

Figure 6:
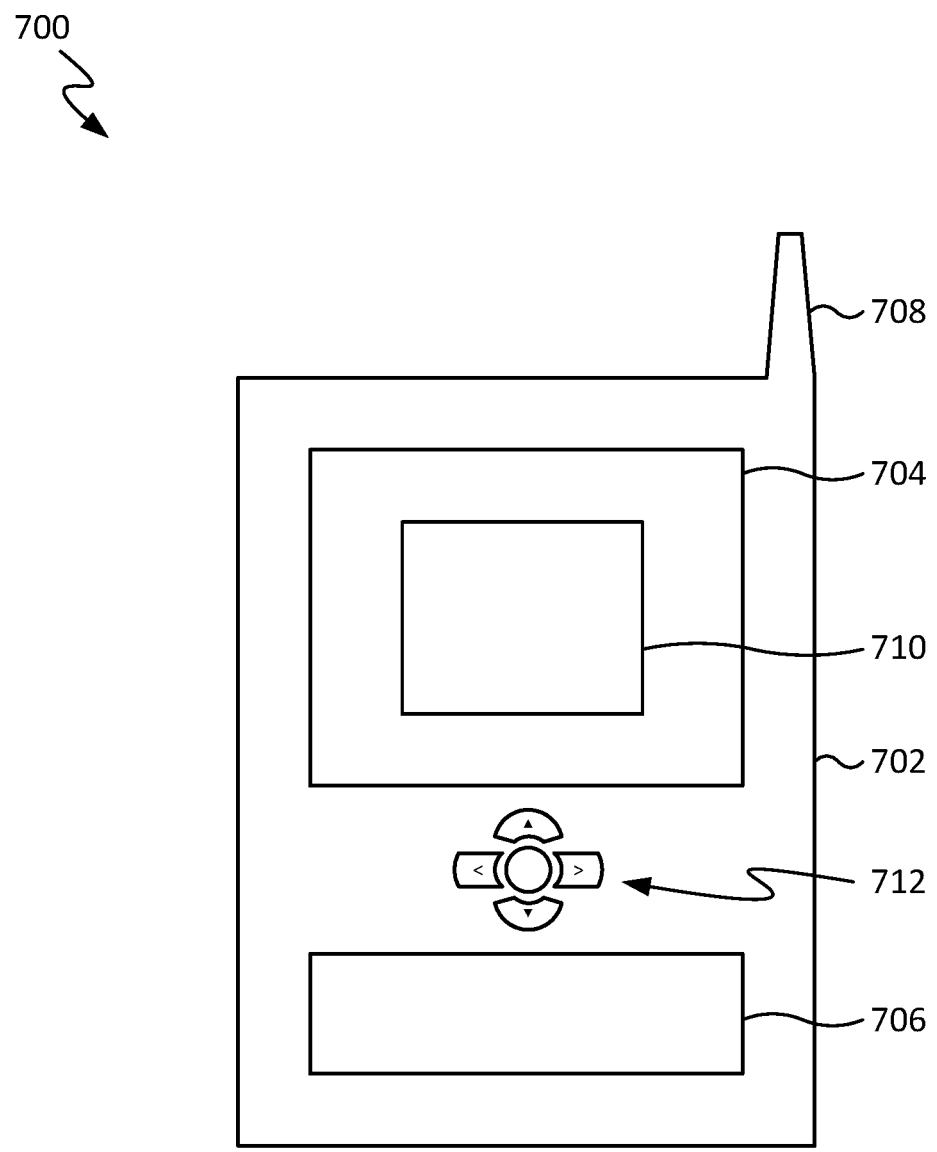
FIG. 6 illustrates embodiments of a small form factor device in which the system of FIG. 5 may be embodied.

As described above, system 600 may be embodied in varying physical styles or form factors. FIG. 6 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 700 may comprise a housing 702, a display 704, an input/output (I/O) device 706, and an antenna 708. Device 700 may include a user interface (UI) 710. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

Further Example Embodiments

The following examples pertain to further embodiments, from which numerous permutations and configurations will be apparent.

Example 1 is a user interface system including: a pointing calculation module configured to compare captured image data with original image data and to output pointing location data based on such comparison, the captured image data provided by a user pointing device pointed at a target location within a displayed image generated from the original image data; and a marking module configured to incorporate into the original image data a pointing indicator based on the pointing location data, the pointing indicator annotating the target location within the displayed image at which the pointing device is pointed.

Example 2 includes the subject matter of any of Examples 1 and 3-9 and further includes the pointing device and a television for displaying the displayed image, wherein the pointing device is a remote control device for controlling the television.

Example 3 includes the subject matter of any of Examples 1-2 and 4-9, wherein the pointing calculation module utilizes edge detection in comparing the captured image data with the original image data.

Example 4 includes the subject matter of any of Examples 1-3 and 5-9, wherein the pointing calculation module utilizes pixel comparison in comparing the captured image data with the original image data.

Example 5 includes the subject matter of any of Examples 1-4 and 6-9, wherein the pointing calculation module matches a center of the captured image with the target location within the displayed image in comparing the captured image data with the original image data.

Example 6 includes the subject matter of any of Examples 1-5 and 7-9, wherein the captured image data is captured by an image capture device hosted by the pointing device.

Example 7 includes the subject matter of Example 6, wherein the image capture device includes a still camera or a video camera.

Example 8 is a computing system including the user interface system including the subject matter of any of Examples 1-7.

Example 9 is a projection device including the user interface system including the subject matter of any of Examples 1-7.

Example 10 is a method of image matching-based pointing in an image displayed by a projection device, the method including: receiving captured image data provided by a user pointing device pointed at a target location within the displayed image; comparing the captured image data with original image data from which the displayed image is generated, and calculating pointing location data based on such comparison; and generating a pointing indicator within the displayed image based on the pointing location data, the pointing indicator annotating the target location within the displayed image at which the pointing device is pointed.

Example 11 includes the subject matter of any of Examples 10 and 12-23, wherein the captured image data includes the entirety of the displayed image.

Example 12 includes the subject matter of any of Examples 10-11 and 13-23, wherein the captured image data is provided by an image capture device hosted by the pointing device.

Example 13 includes the subject matter of any of Examples 10-12 and 14-23, wherein the image capture device includes a still camera or a video camera.

Example 14 includes the subject matter of any of Examples 10-13 and 15-23, wherein the captured image data is provided continuously.

Example 15 includes the subject matter of any of Examples 10-14 and 16-23, wherein comparing the captured image data with the original image data includes performing edge detection between the captured image data and the original image data.

Example 16 includes the subject matter of any of Examples 10-15 and 17-23, wherein comparing the captured image data with the original image data includes performing pixel comparison between the captured image data and the original image data.

Example 17 includes the subject matter of any of Examples 10-16 and 18-23, wherein comparing the captured image data with the original image data includes matching a center of the captured image with the target location within the displayed image.

Example 18 includes the subject matter of any of Examples 10-17 and 19-23, wherein the pointing location data pertains to at least one of pointing direction and/or pointing orientation.

Example 19 includes the subject matter of any of Examples 10-18 and 20-23 wherein comparing the captured image data with the original image data is performed in real time.

Example 20 includes the subject matter of any of Examples 10-19 and 21-23, wherein generating the pointing indicator within the displayed image is performed in real time.

Example 21 includes the subject matter of any of Examples 10-20 and 22-23, wherein generating the pointing indicator within the displayed image is provided with precision resolution of a single pixel.

Example 22 includes the subject matter of any of Examples 10-21 and 23, wherein the pointing indicator highlights the target location within the displayed image.

Example 23 includes the subject matter of any of Examples 10-22, wherein the projection device includes at least one of a television, a projector, a cinema screen, a computer monitor, a laptop/notebook computer display, a tablet computer display, a mobile phone display, a smartphone display, a personal digital assistant (PDA) display, and/or a media player device display.

Example 24 is a non-transitory computer-readable medium encoded with instructions that, when executed by one or more processors, causes a process for image matching-based pointing in an image displayed by a projection device to be carried out, the process including: receiving captured image data provided by a user pointing device pointed at a target location within the displayed image; comparing the captured image data with original image data from which the displayed image is generated, and calculating pointing location data based on such comparison; and generating a pointing indicator within the displayed image based on the pointing location data, the pointing indicator annotating the target location within the displayed image at which the pointing device is pointed.

Example 25 includes the subject matter of any of Examples 24 and 26-37, wherein the captured image data includes the entirety of the displayed image.

Example 26 includes the subject matter of any of Examples 24-25 and 27-37, wherein the captured image data is provided by an image capture device hosted by the pointing device.

Example 27 includes the subject matter of Example 26, wherein the image capture device includes a still camera or a video camera.

Example 28 includes the subject matter of any of Examples 24-27 and 29-37, wherein the captured image data is provided continuously.

Example 29 includes the subject matter of any of Examples 24-28 and 30-37, wherein comparing the captured image data with the original image data includes performing edge detection between the captured image data and the original image data.

Example 30 includes the subject matter of any of Examples 24-29 and 31-37, wherein comparing the captured image data with the original image data includes performing pixel comparison between the captured image data and the original image data.

Example 31 includes the subject matter of any of Examples 24-30 and 32-37, wherein comparing the captured image data with the original image data includes matching a center of the captured image with the target location within the displayed image.

Example 32 includes the subject matter of any of Examples 24-31 and 33-37, wherein the pointing location data pertains to at least one of pointing direction and/or pointing orientation.

Example 33 includes the subject matter of any of Examples 24-32 and 34-37, wherein comparing the captured image data with the original image data is performed in real time.

Example 34 includes the subject matter of any of Examples 24-33 and 35-37, wherein generating the pointing indicator within the displayed image is performed in real time.

Example 35 includes the subject matter of any of Examples 24-34 and 36-37, wherein generating the pointing indicator within the displayed image is provided with precision resolution of a single pixel.

Example 36 includes the subject matter of any of Examples 24-35 and 37, wherein the pointing indicator highlights the target location within the displayed image.

Example 37 includes the subject matter of any of Examples 24-36, wherein the projection device includes at least one of a television, a projector, a cinema screen, a computer monitor, a laptop/notebook computer display, a tablet computer display, a mobile phone display, a smartphone display, a personal digital assistant (PDA) display, and/or a media player device display.

Example 38 is a computing system including: an image source configured to provide an image signal including original image data; a projection device configured to display an image generated from the image signal including the original image data; and a pointing calculation and marking module communicatively coupled with the image source and the projection device, wherein the pointing calculation and marking module is configured to: compare an image signal including captured image data with the image signal including the original image data, the captured image data provided by a user pointing device pointed at a target location within an image generated from the original image data and displayed by the projection device; incorporate into the original image data a pointing indicator based on such comparison, the pointing indicator annotating the target location within the displayed image at which the pointing device is pointed; and output an image signal including the pointing indicator for display by the projection device.

Example 39 includes the subject matter of any of Examples 38 and 40-49, wherein the captured image data is captured by an image capture device hosted by the pointing device.

Example 40 includes the subject matter of any of Examples 38-39 and 41-49, wherein the image capture device includes a still camera or a video camera.

Example 41 includes the subject matter of any of Examples 38-40 and 42-49, wherein the captured image data is provided continuously to the pointing calculation and marking module.

Example 42 includes the subject matter of any of Examples 38-41 and 43-49, wherein the pointing calculation and marking module is configured to compare the original image data and the captured image data in real time.

Example 43 includes the subject matter of any of Examples 38-42 and 44-49, wherein the pointing calculation and marking module utilizes edge detection in comparing the captured image data with the original image data.

Example 44 includes the subject matter of any of Examples 38-43 and 45-49, wherein the pointing calculation and marking module utilizes pixel comparison in comparing the captured image data with the original image data.

Example 45 includes the subject matter of any of Examples 38-44 and 46-49, wherein the pointing calculation and marking module matches a center of the captured image with the target location within the displayed image in comparing the captured image data with the original image data.

Example 46 includes the subject matter of any of Examples 38-45 and 47-49, wherein the pointing indicator is provided with precision resolution of a single pixel.

Example 47 includes the subject matter of any of Examples 38-46 and 48-49, wherein the pointing device is a remote control for at least one of a television and/or set-top box (STB).

Example 48 includes the subject matter of any of Examples 38-47 and 49, wherein the pointing device is a zapper/firearm-type game controller.

Example 49 includes the subject matter of any of Examples 38-48, wherein the pointing device is a pair of smart eyeglasses.

Example 50 is a pointing device for interacting with a computing system, the pointing device including: an image capture device; and a transmitter configured to send image data captured by the image capture device to the computing system.

Example 51 includes the subject matter of any of Examples 50 and 52-56, wherein the image capture device includes a still camera or a video camera.

Example 52 includes the subject matter of any of Examples 50-51 and 53-56, wherein the transmitter is configured to output at least one of an infrared (IR) signal and/or a radio frequency (RF) signal.

Example 53 includes the subject matter of any of Examples 50-52 and 54-56, wherein the computing system is a television, and wherein the pointing device is a remote control for that television.

Example 54 includes the subject matter of any of Examples 50-53 and 55-56, wherein the computing system is a set-top box (STB), and wherein the pointing device is a remote control for that STB.

Example 55 includes the subject matter of any of Examples 50-54 and 56, wherein the computing system is a gaming platform, and wherein the pointing device is a zapper/firearm-type game controller for that gaming platform.

Example 56 includes the subject matter of any of Examples 50-55, wherein the transmitter is configured to send the captured image data to the computing system in real time.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A method for providing user interaction with a machine that present images via a display, the method comprising:
    receiving captured image data, the captured image data comprising at least part of a displayed image and pointing location data;
    comparing the captured image data with original image data from which the displayed image is generated, the original image data not including the pointing location data;
    identifying the pointing location data based on such comparison;
    identifying a location within the displayed image of a pointer indicator based on the identified pointing location data; and
    receiving an input based on selection of a feature within the displayed image, the feature being at the identified location and associated with a function to be carried out in response to the selection.

2. The method of claim 1, wherein the captured image data includes the entirety of the displayed image.

3. The method of claim 1, wherein the captured image data is provided by an image capture device hosted by a pointing device, the image capture device comprising a still camera or a video camera.

4. The method of claim 1, wherein the captured image data is provided continuously.

5. The method of claim 1, wherein comparing the captured image data with the original image data comprises at least one of:
    performing edge detection between the captured image data and the original image data;
    performing pixel comparison between the captured image data and the original image data; and
    matching a center of the captured image with the target location within the displayed image.

6. The method of claim 1, further comprising updating the original image data to include the pointer indicator at the identified location, wherein at least one of comparing the captured image data with the original image data and updating the original image data to include the pointer indicator is performed in real time.

7. The method of claim 1, wherein the machine is at least one of a television, set-top box, a projector, a fixed computing system, a mobile computing system, and a media player.

8. One or more non-transitory computer program products encoded with instructions that, when executed by one or more processors, cause a process to be carried out, the process comprising:
    receiving captured image data, the captured image data comprising at least part of a displayed image and pointing location data;
    comparing the captured image data with original image data from which the displayed image is generated, the original image data not including the pointing location data;
    identifying the pointing location data based on such comparison;
    identifying a location within the displayed image of a pointer indicator based on the identified pointing location data;
    receiving an input based on selection of a feature within the displayed image, the feature being at the identified location and associated with a function to be carried out in response to the selection.

9. The one or more non-transitory computer program products of claim 8, wherein the captured image data includes the entirety of the displayed image.

10. The one or more non-transitory computer program products of claim 8, wherein the captured image data is provided continuously.

11. The one or more non-transitory computer program products of claim 8, the process further comprising updating the original image data to include the pointer indicator at the identified location.

12. A system comprising the one or more non-transitory computer program products of claim 8, wherein the system further comprises at least one of a television, set-top box, a projector, a fixed computing system, a mobile computing system, a game console, and a media player.

13. The system of claim 12, further comprising a remote control configured with an image capture device to provide the captured image data, wherein the user input based on selection of a feature within the displayed image is responsive to a user selection via the remote control.

14. A user interface system, comprising:
a processor;
a pointing calculation module executable by the processor and configured to:
receive captured image data, the captured image data comprising at least part of a displayed image and pointing location data;
compare the captured image data with original image data from which the displayed image is generated, the original image data not including the pointing location data;
identify the pointing location data based on such comparison; and
identify a location within the displayed image of a pointer indicator based on the identified pointing location data;
a marking module executable by the processor and configured to update the original image data to include the pointer indicator at the identified location; and
a remote control configured with an image capture device to provide the captured image data, wherein an input selecting a feature within the displayed image is responsive to a selection via the remote control.

15. The system of claim 14, further comprising at least one of a television, set-top box, a projector, a fixed computing system, a mobile computing system, a game console, and a media player.

16. The system of claim 15, wherein the image capture device is configured to provide the captured image data, wherein the input provided to the system is based at least in part on the remote control pointing at a target feature within the displayed image.

17. The system of claim 16, wherein the remote control is for controlling at least one of a television and a set-top box.

18. The system of claim 16, wherein the remote control is a game controller for controlling at least one of a game console and a set-top box.

19. The system of claim 16, wherein the remote control is for controlling a projector.

20. The system of claim 16, wherein the remote control is for controlling a computing system.

* * * * *